United States Patent Office 3,630,917
Patented Dec. 28, 1971

3,630,917
HEAT TRANSFER COMPOSITION
Robert S. McCord, Pacific Palisades, Calif., assignor to Douglas McDonnell Corporation, Santa Monica, Calif.
No Drawing. Continuation of application Ser. No. 649,819, June 29, 1967, which is a continuation-in-part of application Ser. No. 344,092, Jan. 29, 1964.
This application Apr. 7, 1969, Ser. No. 816,157
The portion of the term of the patent subsequent to Oct. 22, 1985, has been disclaimed
Int. Cl. C09k 3/02
U.S. Cl. 252—78
8 Claims

ABSTRACT OF THE DISCLOSURE

Heat transfer composition consisting essentially of a tetraalkyl orthosilicate having alkyl groups each containing not in excess of 4 carbon atoms and a minor proportion not more than about 15% by weight of said composition, of a polyalkylene glycol material, preferably a polyalkylene glycol diether, such composition having low viscosity at low temperatures, i.e., less than about 250 centistokes at −65° F., good hydrolytic stability and fire resistance, and a reduced shrinkage effect on rubber O-ring seals.

This application is a continuation of my copending application Ser. No. 649,819 filed June 29, 1967, and now abandoned, which in turn is a continuation-in-part of my copending application Ser. No. 341,092, filed January 29, 1964, and now abandoned.

This invention relates to a novel fluid heat transfer medium, and is especially concerned with the provision of novel cooling fluids designed particularly for use at very low temperatures, especially in aircraft and electronic systems.

A major problem in the operation of electrical computers, radar equipment, and life-support systems in aircraft, and the like, is the removal of heat energy. Generally, this is accomplished by circulating a liquid heat transfer medium or fluid from the hot area to a heat sink and back again. This problem is particularly severe where temperature of operation can range from −40° F. down to as low as about −150° F.

In low temperature operations of this type, it has been found from experience that not only is it necessary that a liquid heat transfer medium or liquid coolant have a high specific heat and high thermal conductivity, but of even greater importance, such fluids must have a low viscosity, since it governs the effort required to pump the fluid. Not only is the available pumping energy limited, for example, in most airborne systems, but since ultimately the pumping energy must also be removed as heat from the circulating fluid, it further taxes the heat sink. In addition to low viscosity, nonvolatility is desirable so that local boiling at hot spots or cavitation in the pump will not occur. Further, the heat transfer fluid employed in such systems must have high hydrolytic and thermal stability, a minimum adverse effect on materials of construction with which it comes into contact, and of particular importance, the fluid should have good fire resistance. It is of particular importance that if spilled upon electrical insulation, the fluid should not harm the insulation or cause electrical short circuit, or in any way change the electrical characteristics of the system.

The Foehr Pat. 2,717,242 discloses a lubricant composition having relatively high viscosity, consisting of a tetraalkyl orthosilicate, having alkyl groups containing "most advantageously 5 to 8 carbon atoms," and 20 to 80% by volume of a polyalkylene glycol polymeric material such as polypropylene glycol diether. The high viscosity particularly of the lubricant compositions of this patent, substantially higher than 250 centistokes at −65° F. would make such lubricant compositions unsuitable as a heat transfer medium particularly in the very low temperature range of operation below −65° F. down to −150° F.

It has been found according to the invention that fluid compositions meeting the above-noted requirements are provided by mixtures consisting essentially of a tetraalkyl orthosilicate having alkyl groups each containing not in excess of 4 carbon atoms, and a minor proportion not more than about 15% by weight of the composition, of a polyalkylene glycol material, preferably a polyalkylene glycol diether. Of particular significance, the cooling fluid compositions of the invention have low viscosity at low temperature, i.e., less than about 250 centistokes at −65° F., have good hydrolytic stability and fire resistance, and have a reduced shrinkage effect on rubber O-ring seals as compared to the orthosilicate itself.

The tetraalkyl orthosilicates employed as the base material in the invention composition are preferably those having alkyl groups containing a minimum member of carbon atoms, limited only by the hydrolytic stability of the silicate. Thus, according to the invention, such alkyl groups contain not more than 4 carbon atoms, i.e., from 1 to 4 carbon atoms. For example, such alkyl groups can be methyl, ethyl, propyl, butyl, isopropyl, isobutyl and tertiary butyl, and all of the alkyl groups may be the same or different. The methyl and ethyl derivatives have a lower fire resistance than the tetraalkyl derivatives containing 3 to 4 carbon atoms in the alkyl chains, and the methyl and ethyl derivatives tend to hydrolyze more readily than the propyl and butyl derivatives of the orthosilicates. Hence, it is not preferred to use the methyl or ethyl groups, but if used, there should also be present one or preferably a plurality of alkyl groups containing 3 to 4 carbon atoms in the orthosilicate, e.g., ethyl tri-isopropyl orthosilicate and methyl tri-isobutyl orthosilicate.

The preferred orthosilicate esters employed in the invention composition have alkyl groups containing 3 to 4 carbon atoms. Of these, the branched chain alkyl orthosilicates are most desirable, due to their greater hydrolytic and thermal stability. Hence a preferred form of tetraalkyl orthosilicate for use in the invention compositions are those which contain isopropyl and isobutyl groups. Mixtures of such orthosilicates can also be employed. Illustrative of the latter are tetraalkyl orthosilicates containing, for example, an average of 2 to 3 isopropyl groups and 1 to 2 isobutyl groups.

Specific examples of orthosilicates which can be used in the invention composition include tetraisopropyl silicate, tetra (n-butyl) silicate, tetraisobutyl silicate, tetra n-propyl silicate, di n-propyl di n-butyl silicate, di-isopropyl di-isobutyl silicate, isopropyl triisobutyl silicate, isobutyl triisopropyl silicate, tertiary butyl triisopropyl silicate, and the like.

The above-noted tetralkyl orthosilicate esters used as the major component of the cooling fluids of the invention are not useful alone as a heat transfer medium or coolant, despite their excellent low viscosity and low volatility. In the first place, such silicates are susceptible to hydrolysis. When used as a cooling, circulating medium and pumped in the presence of water or moisture, they react to form gels of $SiO_2$ which hinder flow of the fluids and cause wear in the pump. Secondly, the silicates, if used alone as a cooling medium, tend to extract the plasticizers from many types of rubber such as those used in the O-ring seals in cooling liquid systems, causing the rings to shrink and leak.

Addition of the polyalkylene glycol material, preferably the polyalkylene glycol di-ether, in certain minor proportions noted below, to the above-noted silicates overcomes the above-noted defects of the orthosilicate when used alone, without materially increasing the desirable low viscosity of such silicates. Thus, such polyakylene glycol materials are miscible with the silicates over a wide temperature range, their own viscosity and volatility are low, they are substantially hydrophobic, and impart this important characteristic to the mixture, and the addition of such polyalkylene glycols greatly inhibits or prevents shrinkage of O-ring seals employed in cooling systems.

Although polyalkylene glycols having one or more free hydroxyl terminal groups can be employed, the preferred polyalkylene glycol materials are those in which one or both of the terminal hydroxy groups have been removed to form ether groups, providing mono- or di-ether derivatives, or combinations thereof. The most desirable materials for purposes of the invention are the di-ethers. A particularly satisfactory material has been found to be the butyl, ethyl di-ether of polypropylene glycol.

The polyalkylene glycol materials employed in the invention composition preferably are substantially hydrophobic materials. It is preferred not to employ those polyalkylene glycols that are to any significant extent water miscible and which would accordingly tend to dissolve water at one temperature and crystallize water out at lower temperatures. Also, in order to maintain as low a viscosity of the cooling fluid as possible, the glycols employed should have a molecular weight not above 1,000, preferably between about 400 and about 800, and most desirably about 600 to about 700. In preferred practice, the polyalkylene glycol component, e.g., the polyakylene glycol diether, should have a viscosity at —40° F. not in excess of about 860 centistokes. Also, it is desirable that the polyalkylene glycol component employed be of a type which tends to supercool and to remain liquid at temperatures down to about —65° F.

The ether and groups on the polyalkylene glycol materials are preferably oxyalkyl groups, the alkyl radicals of which can range from 1 to about 8 carbon atoms in length. The longer chain alkyl groups having in excess of 4 carbon atoms, e.g., pentyl, hexyl, heptyl and octyl, are not preferred because polyalkylene glycol ethers of this type have increased viscosity. It is preferred to employ one or more end alkyl groups on the polyalkylene glycol mono- or di-ether which have from 1 to 4 carbon atoms, including branched-chain alkyls of this type. Thus, preferred end alkyl groups are, for example, methyl, ethyl, n-propyl, isopropyl, n-butyl, isobutyl, and the like. It is often desirable that one of the end alkyl groups be an ethyl radical while the other end alkyl group of the di-ether be, for example, a propyl or butyl radical.

The alkylene groups of the polyalkylene glycol material can be an ethylene or propylene group, or mixtures thereof, that is, copolymers containing ethylene and propylene groups. The propylene polymers are preferred over the ethylene polymers, because of the increased water solubility of the ethylene polymers.

Particularly satisfactory polyalkylene glycol materials for purposes of the invention are the n-butyl ethyl, isobutyl ethyl, n-propyl ethyl and isopropyl ethyl diethers of polypropylene glycol.

The preferred polyalkylene glycol materials employed in the invention composition can be produced in known manner from the 1,2-alkylene glycols. Thus, for example, polypropylene glycol materials are prepared by reacting 1,2-propylene oxide and the corresponding alkylene glycol to form poly-1, 2-propylene glycol derivatives, and one or both terminal hydroxy groups can be removed to provide the above-noted ether groups, either during or after polymerization. The term "polypropylene glycol" employed in the specification and claims is intended to denote and include the above-noted poly-1,2-propylene glycol derivatives.

The polyalkylene glycol material, preferably the diether, is employed in as small an amount in the tetraalkyl orthosilicate-base material as is possible in order to obtain the above-noted important properties of the cooling fluid and at the same time cure the above-noted defects of the tetraalkyl orthosilicates when employed alone as a cooling medium. Particularly, in order to obtain a cooling fluid having low viscosities less than about 250 centistkoes at —65° F., and employing the above described orthosilicates, not more than about 15%, preferably not more than about 10%, of the polyalkylene glycol material is incorporated in the tetraalkyl orthosilicate, such amounts of the glycol material being sufficient to stabilize such silicate against hydrolysis and to substantially overcome its rubber-shrinking tendencies. Thus, the amount of polyalkylene glycol employed can range from about 2 to about 15%, preferably from about 2% to about 10% by weight of the cooling fluid composition, the balance of the composition being the above described tetraalkyl orthosilicate. Not only are the viscosities of the coolant fluid compositions of the invention not more than 250 centistokes and preferably below 100 centistokes at —65° F., but the invention compositions have sufficiently low viscosity such that at —130° F. to —150° F. such compositions in many cases have a sufficiently low viscosity, e.g., less than about 13,000 centistokes at such low temperatures, permitting such fluid compositions to be employed as coolants in the very low temperature range of between —65° F. and about —150° F. This is of particular importance in many airborne applications.

It has been found that the combination of a tetraalkyl orthosilicate which contains not more than 4 carbon atoms and a proportion of not more than about 15% by weight of the total composition, of the polyalkylene glycol component described above, are required to provide the above noted improved properties, and to provide an efficient heat transfer medium or coolant having the extremely low viscosity of less than 250 centistokes, preferably less than 100 centistokes, at low temperatures of the order of —65° F. required for use in modern airborne systems. Where tetraalkyl orthosilicates containing alkyl groups having 5 or more carbon atoms are employed in combination with more than 15% by weight of the above described polyalkylene glycol component, the resulting compositions have a viscosity substantially higher than 250 centistokes at —65° F., as disclosed in the above Foehr patent, rendering them unsuitable for use as very low temperature coolants at —65° F., e.g., between —65° F. and —150° F., according to the invention. Even when employing less than 15% by weight of the glycol component, e.g., about 10%, in combination with the last mentioned orthosilicates, the resulting compositions in large measure have viscosities substantially in excess of 250 centistokes at —65° F. This is shown by the table below:

| | Compositions (percent by weight) | | | | | | | | |
|---|---|---|---|---|---|---|---|---|---|
| | (1) | (2) | (3) | (4) | (5) | (6) | (7) | (8) | (9) |
| Ucon DLB 62E (n-butyl ethyl diether of polypropylene glycol) | 10 | 15 | 20 | 25 | 10 | 15 | 20 | 25 | 10 |
| Tetra (2-ethyl butyl) orthosilicate | 90 | 85 | 80 | 75 | | | | | |
| Tetra (2-ethyl hexyl) orthosilicate | | | | | 90 | 85 | 80 | 75 | |
| Mixed isopropyl, isobutyl tetra orthosilicate having the average composition (Iso-$C_3H_7O)_{2.5}$ Si(O Iso-$C_4H_9$)$_{.5}$ | | | | | | | | | 90 |
| Viscosity (centistokes) at —65° F | 300 | 335 | 394 | 424 | 1,310 | 1,370 | 1,470 | 1,570 | 38 |

From the table above, it is evident that the employment of a tetraalkyl orthosilicate having alkyl groups containing in excess of 4 carbon atoms, in combination with more than 15% by weight of the glycol ether, Ucon DLB 62E, forms a composition having a viscosity substantially in excess of 250 centistokes at −65° F., as illustrated by compositions (2) to (4) and (6) to (8) of the above table, and even when the proportion of the glycol ether is substantially less than 15% and of the order of about 10% by weight of the composition, as illustrated by compositions (1) and (5) above, the resulting compositions have viscosities substantially in excess of 250 centistokes at −65° F. On the other hand, composition (9) according to the invention, corresponding to Composition D below, and employing a tetraalkyl orthosilicate containing alkyl groups having not in excess of 4 carbon atoms, in combination with the glycol ether in a proportion of less than 15% by weight of the composition, produces a heat transfer medium or coolant according to the invention having a viscosity at −65° F. substantially less than 250 centistokes.

The addition of small amounts of other materials such as phenyl alpha naphthyl amine are useful as a further aid to both the tetraalkyl orthosilicate and the polyalkylene glycol materials to reduce the tendency toward any hydrolysis of the silicate and also to inhibit oxidation of the polyalkylene glycol, particularly the polyalkylene glycol diether preferably employed. Additives of this type are incorporated in minor amount, e.g., about 0.05% to about 2%, preferably about 0.1% to about 1%, by weight of the composition.

Although the incorporation of such additives is often desirable, they are not necessary for purposes of the invention.

EXAMPLE 1

Examples of coolant fluid compositions according to the invention, are as follows:

Composition A

| | Percent by weight |
|---|---|
| Tetra n-propyl orthosilicate | 90 |
| n-Propyl ethyl di-ether of polypropylene glycol (molecular weight, 400–600) | 10 |

Composition B

| | Percent by weight |
|---|---|
| Tetra n-butyl orthosilicate | 92 |
| n-Butyl ethyl di-ether of polypropylene glycol (molecular weight, 500–800) | 8 |

Composition C

| | Percent by weight |
|---|---|
| Tetra isobutyl orthosilicate | 91 |
| Isobutyl ethyl di-ether of polypropylene glycol (molecular weight, 500–800) | 8.5 |
| Phenyl alpha naphthyl amine | 0.5 |

Composition D

| | Percent by weight |
|---|---|
| Mixed isopropyl, isobutyl tetraorthosilicate ester having the average composition $(Iso\text{-}C_3H_7O)_{2.5}Si(O\text{-}Iso\text{-}C_4H_9)_{1.5}$ marketed as Hydrotherm 700–130 by American Hydrotherm Corporation | 90 |
| n-Butyl ethyl di-ether of polypropylene glycol having a viscosity of 62 Saybolt Universal Seconds at 100° F., marketed as "Ucon DLB 62E" by Union Carbide Chemical Company (molecular weight, 600–700) | 10 |

Composition E

| | Percent by weight |
|---|---|
| Mixed isopropyl, isobutyl tetraorthosilicate ester having the composition $(Iso\text{-}C_3H_7O)_{2.5}Si(O\text{-}Iso\text{-}C_4H_9)_{1.5}$ marketed as Hydrotherm 700–130 by American Hydrotherm Corporation | 89.5 |
| n-Butyl ethyl di-ether of polypropylene glycol having a viscosity of 62 Saybolt Universal Seconds at 100° F., marketed as "Ucon DLB 62E" by Union Carbide Chemical Company (molecular weight 600–700) | 10 |
| Phenyl alpha naphthyl amine | 0.5 |

Composition F

| | Percent by weight |
|---|---|
| Ethyl triisopropyl orthosilicate | 87 |
| n-Propyl, n-butyl di-ether of polyisopropylene glycol (molecular weight, 500–700) | 13 |

Composition G

| | Percent by weight |
|---|---|
| Di-ethyl di-n-butyl orthosilicate | 90 |
| n-Propyl ethyl di-ether of the copolymer of ethylene and propylene glycol (molecular weight, 500–800) | 9 |
| Phenyl alpha naphthyl amine | 1 |

Composition H

| | Percent by weight |
|---|---|
| Tetraisopropyl orthosilicate | 90 |
| Mono ethyl ether of polypropylene glycol (molecular weight, 400–500) | 10 |

Composition J

| | Percent by weight |
|---|---|
| Tri-isobutyl isopropyl orthosilicate | 95 |
| n-Propyl n-octyl di-ether of polypropylene glycol (molecular weight, 800–1,000) | 5 |

Composition K

| | Percent by weight |
|---|---|
| Di-ethyl di-n-propyl orthosilicate | 87 |
| Di-ethyl ether of polypropylene glycol (molecular weight, 400–600) | 13 |

Composition L

| | Percent by weight |
|---|---|
| Di-isopropyl, di-isobutyl orthosilicate | 96.5 |
| n-Butyl ethyl di-ether of polypropylene glycol (molecular weight, 500–700) | 3.0 |
| Phenyl alpha naphthyl amine | 0.5 |

EXAMPLE 2

Composition E above was tested as a cooling medium for use in an aircraft life support system, and has the following properties:

| | |
|---|---|
| Kinematic viscosity (ASTM D–445) in centistokes at— | |
| −65° F. | 37.4 |
| 0° F. | 7.3 |
| 100° F. | 2.1 |
| 210° F. | 0.95 |
| Flash point (ASTM D92) ° F. | 190 |
| Fire point (ASTM D92) ° F. | 210 |

EXAMPLE 3

Composition D above has properties similar to those of Composition E in Example 2, and Composition D can be employed as a cooling medium in electronic equipment.

EXAMPLE 4

Compositions A, B, C and F to L also have low viscosity values substantially below 250 centistokes at temperature of −65° F., and are useful as circulating cooling fluids in electronic systems and radar equipment.

EXAMPLE 5

The following tests show the effect of exposure of O-ring rubber seals formed of two types of rubber on the silicate ester alone of Composition E, and the effect of identical exposure on the same rubber seals of a coolant formulation according to the invention, Composition E, which incorporates such silicate ester as base therein. The O-ring seals noted as 1 and 2 in the table below are composed of a Buna-N rubber, a butadiene-acrylonitrile copolymer. Also, in the table below, the term "HT–130" is the mixed isopropyl isobutyl tetraorthosilicate of Composition E above.

In these tests, each of the two O-ring seals was immersed in silicate ester "HT–130" and in Composition E. Volume change after immersion in these fluids for three days and 7 days at 160° F. was determined for each of the O-ring seals according to ASTM–D471–57T. The results are set forth in the table below.

| Fluid | O-ring seals | Percent volume change | |
|---|---|---|---|
| | | 3 days immersion | 7 days immersions |
| HT–130 | 1 | −3.77 | −3.39 |
| HT–130 | 2 | −4.68 | −4.50 |
| Composition E | 1 | −1.68 | −1.58 |
| Do | 2 | −1.29 | −1.61 |

From the table above, it is seen that the silicate ester HT–130 produced a substantial shrinkage in volume of the Buna-N O-ring seals after 3 days' and 7 days' immersion in these fluids. On the other hand, shrinkage of the same O-ring seals was materially reduced in Composition E of the invention containing HT–130 and a minor amount of a polyalkylene glycol material according to the invention, after 3 days' and 7 days' immersion therein.

In summary, I have unexpectedly found that fluid compositions are provided according to the invention having a visosicty at −65° F. of less than about 250 centistokes and having other properties rendering them particularly useful as circulating cooling media at very low temperatures, such compositions comprising a mixture of a tetraalkyl orthosilicate and a polyalkylene glycol material, wherein the tetralkyl orthosilicate employed contains alkyl groups having not more than four carbon atoms and wherein only a small amount not more than about 15% by weight of the composition of a polyalklene glycol material, preferably the di-ether of a polyalkylene glycol, is employed.

While I have described particular embodiments of my invention for the purpose of illustration, it should be understood that various modifications and adaptations thereof may be made within the spirit of the invention, as set forth in the appended claims.

I claim:

1. A heat transfer composition consisting essentially of tetraalkyl orthosilicate having alkyl groups each containing not in excess of 4 carbon atoms, and a minor proportion about 2 to about 10% by weight of said composition, of a substantially water-immiscible polyalkylene glycol material having terminal groups selected from the class consisting of free hydroxyl and ether groups, said glycol material containing at least one ether group, said ether groups being oxyalkyl groups, wherein the alkyl radicals contain from 1 to about 8 carbon atoms, said alkylene groups being selected from the class consisting of ethylene and propylene radicals, and mixtures thereof, said polyalkylene glycol material having a molecular weight not in excess of about 1,000, said composition having a viscosity at −65° F. of less than about 250 centistokes.

2. A heat transfer composition as defined in claim 1, said polyalkylene glycol material being a polypropylene glycol ether having a terminal oxyalkyl group wherein the alkyl radicals contain from 1 to about 8 carbon atoms.

3. A heat transfer composition as defined in claim 2, wherein said polypropylene glycol ether is a diether having a pair of said terminal oxyalkyl groups, wherein the alkyl radicals contain from 1 to about 8 carbon atoms.

4. A heat transfer composition as defined in claim 2, wherein said alkyl groups of said tetralkyl orthosilicate contain from 3 to 4 carbon atoms, and said polypropylene glycol ether is a diether having a pair of said terminal oxyalkyl groups wherein the alkyl radicals contain from about 1 to about 8 carbon atoms.

5. A heat transfer composition as defined in claim 2, wherein said polypropylene glycol ether is a diether having a pair of terminal oxyalkyl groups where in the alkyl radicals contain from 1 to about 4 carbon atoms.

6. A heat transfer composition as defined in claim 4, said polypropylene glycol diether having a molecular weight between about 400 and about 800.

7. A heat transfer composition as defined in claim 2, operable as cooling fluid medium at temperatures of the order of −65° F., said orthosilicate being a mixed isopropyl isobutyl tetraorthosilicate and said glycol ether being an n-butyl ethyl diether of polypropylene glycol having a molecular weight of between about 400 and about 800, said composition having a viscosity at −65° F. less than about 100 centistokes.

8. A heat transfer composition as defined in claim 5, wherein said alkyl groups of said tetraalkyl orthosilicate are branched-chain alkyls containing 3 to 4 carbon atoms.

References Cited
UNITED STATES PATENTS
2,717,242  9/1955  Foehr _____ 252—49.6
3,407,142  10/1968  McCord _____ 252—78

OTHER REFERENCES
Hatton: "Introduction to Hydraulic Fluids," p. 12, Reinhold Publishing Corp., New York, 1962.

Technical Bulletin: " 'Ucon' Fluids and Lubricants," Union Carbide Chemicals, 1960, p. 13.

LEON D. ROSDOL, Primary Examiner

H. A. PITLICK, Assistant Examiner

U.S. Cl. X.R.

252—73